3,452,112
PREPARATION OF SOLUTIONS OF LITHIUM-HYDROCARBON COMPOUNDS
Conrad W. Kamienski, Gastonia, Arthur C. Diesing, Durham, and Robert C. B. Morrison, Gastonia, N.C., assignors to Lithium Corporation of America, New York, N.Y., a corporation of Delaware
No Drawing. Continuation-in-part of application Ser. No. 626,684, Mar. 29, 1967, which is a continuation-in-part of application Ser. No. 334,013, Dec. 27, 1963. This application Aug. 28, 1968, Ser. No. 755,773
Int. Cl. C07f 1/02; B01j 11/00; C09k 3/00
U.S. Cl. 260—665                                                          12 Claims

ABSTRACT OF THE DISCLOSURE

A method of preparing organic solvent solutions of lithium-hydrocarbon compounds, exemplified by the formula R—Li$_x$, where R is a hydrocarbon radical, and $x$ is an integer, generally 1 to 4, which comprises adding, to a dispersion of finely divided lithium in a non-reactive liquid medium, a preformed R—Li$_x$ compound as a catalyst, and then adding to the resulting mixture an unsaturated hydrocarbon or a hydrocarbon halide which is reactive with lithium to produce the R—Li$_x$ compound.

CROSS-REFERENCE TO RELATED APPLICATION

This application is a continuation-in-part of application Ser. No. 626,684, filed Mar. 29, 1967 now abandoned, which is, in turn, a continuation-in-part of application Ser. No. 334,013, filed Dec. 27, 1963 now Patent Number 388,178, issued June 11, 1968.

BACKGROUND OF THE INVENTION

Field of the invention

This invention relates to the preparation of organic solvent solutions of lithium-hydrocarbon compounds by a novel and useful method.

Description of the prior art

The preparation of organic solvent solution solutions of lithium-hydrocarbon compounds is well known to the art and is disclosed in many patents and printed publications among which are, for example, U.S. Patents No. 2,816,936; 2,865,969, 3,091,606 and 3,122,592. Lithium-hydrocarbon compounds the preparation of which is contemplated by the present invention include, for instance, alkyllithiums, alkenyllithiums, alkylenedilithiums, alkenylenedilithiums, aryllithiums and arylenedilithiums, illustrative examples of which are ethyllithium, propyllithium, isopropyllithium, butyllithium, isobutyllithium, tert-butyllithium, amyllithium, isoamyllithium, hexyllithium, isohexyllithium, heptyllithiums, octyllithiums, vinyllithium, allyllithium, and phenyllithium; 1,4-dithiobutane; 1,4 - diithiobenzene; 1,4-dilithio-4-phenylbutane; 1,4-dilithio-3-methylbenzene; lithium-conjugated polyene adducts such as dilithium adducts of isoprene, butadiene, and others such as are shown in the foregoing patents.

The reactions, generally speaking, tend to proceed somewhat slowly and, therefore, various activators or catalysts have been suggested to enhance the rate of reaction. Thus, for instance, in the case of the preparation of organic solvent solutions of lithium-conjugated polyene hydrocarbon adducts, known methods involve reacting a conjugated polyene hydrocarbon, such as isoprene or 1,3-butadiene, with lithium metal, in the form of wire, or in the form of a dispersion of fine particles of lithium metal in an inert liquid hydrocarbon, in an ether reaction medium such as dimethyl ether, with or without other inert medium materials, said reaction medium including a polycyclic aromatic hydrocarbon, such as naphthalene, as an activator or catalyst.

SUMMARY OF THE INVENTION

The present invention involves the production of lithium-hydrocarbon compounds, in the form of organic solvent solutions, said compounds being exemplified by the formula R—Li$_x$ where R is a hydrocarbon radical selected from the group consisting of alkyl, aryl, alkylene, arylene and alkenylene, particularly in the range of $C_2$ to $C_{20}$ and especially $C_4$ to $C_{10}$, and $x$ is an integer at least 1 and preferably 1 to 4, wherein there is provided a dispersion of finely divided lithium in a liquid with which the lithium is essentially unreactive, and there is added to said dispersion, as a catalyst, a preformed lithium-hydrocarbon corresponding to the formula R—Li$_x$, where R is a hydrocarbon radical as aforesaid, and adding to the reaction mixture an unsaturated hydrocarbon or a hydrocarbon halide which is reactive with lithium to produce a R—Li$_x$ compound. The aforesaid performed lithium-hydrocarbon corresponding to the formula R—Li$_x$ which is used as a catalyst may be the same R—Li$_x$ compound which it is the purpose of the method to produce; or, alternatively, the R—Li$_x$ catalyst may be different from the R—Li$_x$ compound which it is the purpose of the method to produce. Thus, in the first situation, for instance, where the R—Li$_x$ compound being produced by the method is n-butyllithium, the R—Li$_x$ catalyst is n-butyllithium; and, in the second instance, where the R—Li$_x$ compound being produced by the method is n-butyllithium, the R—Li$_x$ catalyst may be, for example, vinyllithium or the dilithio dimer of isoprene. It is, however, usually most desirable to use as the catalyst the same R—Li$_x$ compound which is desired to be produced by the method.

The compositions which result are in the form of aromatic hydrocarbon solutions, particularly benzene solutions, of lithium-conjugated polyene hydrocarbon adducts, especially dilithium-isoprene dimers, which are characterized by stability against breakdown over extended periods of time, of the order of one or two months and not infrequently for periods of time substantially in excess of two months, when stored at low temperatures out of the presence of air, moisture and light. So far as can be ascertained, stabilities of lithium-conjugated polyene hydrocarbon adducts, such as lithium-isoprene adducts of the character obtained pursuant to the practice of the present invention, have not been reported in the literature.

DESCRIPTION OF THE PREFERRED EMBODIMENTS

In its more limited and particularly important aspects, the method of the present invention involves providing a mixture of (a) a dispersion of lithium in mineral oil, the particle size of the lithium being essentially in the range of 0.01 to 0.1 mm. in diameter, (b) benzene, and (c) dimethyl ether; adding thereto, as a catalyst, a preformed or previously prepared lithium-isoprene adduct dissolved in benzene; gradually adding isoprene while maintaining the reaction mixture at a temperature in the range of —20 to —30 degrees C.; adding additional benzene to the reaction mixture; passing an inert gas, for instance, argon, over the reaction mixture to purge the same of the dimethyl ether; adding an additional quantity of benzene and warming the reaction mixture to a temperature of 30 to 35 degrees C.; and then filtering to remove unreacted lithium metal whereby to form a clear solution of the lithium-isoprene adduct in benzene.

In the practice of the method of the present invention, pure or essentially pure lithium metal or a commercial source of lithium metal is effectively used. It has heretofore been known to employ small percentages of sodium metal, for instance, of the order of about 0.25 to about 1 weight percent or more based on the lithium metal, in the production of alkyllithiums, alkylenelithiums, aryllithiums, lithium-conjugated diene adducts, and the like. Small amounts of sodium in the lithium, either inherently present in commercial sources of lithium metal, or added to particularly pure lithium metal in amounts of the order of 0.25 to 0.8% to alloy therewith can be used in conjunction with the lithium metal, as described above, and, similarly small amounts of other metals such as potassium, rubidium, cesium and calcium, can be present, if desired.

Among the aromatic hydrocarbon solvents, used in the above-described reaction, generally of volatile character, which can be used in place of benzene are, for example, toluene, xylenes, n-heptane and n-hexane, or mixtures of any two or more thereof (comprising generally from 10 to 20% of the total of the hydrocarbon solvent to be used).

The organic solvents, generally of volatile character, used for the formation of the final lithium-conjugated polyene hydrocarbon adduct, said solvents constituting generally from 80 to 90% of the total organic solvent employed, can be of aromatic character, examples of which are benzene, toluene and xylenes; straight chain and branched C to $C_{10}$ hydrocarbons such as n-pentane, n-hexane and n-heptane, or mixtures of paraffin hydrocarbons such as petroleum ether; mixtures of aromatic and paraffinic hydrocarbon solvents such as lactol spirits; and compatible mixtures of any two or more of the foregoing.

With regard to the lithium metal dispersions used in carrying out the method of the invention, it is especially desirable to use mineral oil or heptane dispersions of the lithium metal. However, other media of inert character, that is, with which the metallic lithium is essentially unreactive, can be used, advantageously normally liquid paraffinic hydrocarbons, such as kerosene, isooctane, n-heptane and n-octane, as well as other materials such as tetrahydrofuran. The particle size of the lithium is quite variable but, for best results, as stated above, the diameters of the lithium metal particles in the mineral oil or like dispersions should be within the range of about 0.01 to 0.1 mm.

While the present invention is of particular importance in connection with the production of lithium adducts of isoprene compounds, it is also of significant value in regard to the production of lithium adducts of other conjugated polyene hydrocarbon polymers, particularly dienes, of straight chain or branched chain character, as, for example, 1,3-butadiene; dialkyl-butadienes, particularly those in which the alkyl groups contain from 1 to 3 carbon atoms; 2,5-dimethyl-2,4-hexadiene; 1,3,5,-hexatriene; allocimene; myrcene; and various others such as are disclosed, for instance, in the aforementioned U.S. patents. Also encompassed within the scope of the present invention is the production of lithium adducts of vinylidene-substituted aromatic compounds such as styrene, alpha-methyl styrene, 3-vinyltoluene, 1-vinyl naphthalene, and trans-stilbene, as well as numerous other vinylidene-substituted hydrocarbons such as are disclosed in U.S. Patent No. 3,091,606.

The ratios of the lithium metal to conjugated polyene hydrocarbon, particularly isoprene or 1,3-butadiene, are variable but, in the usual case, will fall within the range of from 0.8 to 1.25 gram atoms of lithium per gram mol of said polyene, especially from 0.9 to 1 gram atom of lithium per mol of said polyene.

Reaction temperatures are also variable depending upon the particular reactants utilized. In the case of the lithium conjugated diene adducts, for example, they will normally fall within the range of −25 to 25 degrees C. under superatmospheric pressure and, generally speaking, such reactions will be carried out in the range of −50 to 5 degrees C., and more advantageously, in the range of −30 to 5 degrees C. Desirably the reaction temperature is maintained at about −20 to −25 degrees C., at atmospheric pressure, and the ether, such as dimethyl ether, is then removed, at atmospheric pressure. It is desirable, at the conclusion of the reaction, to apply heat, with or without vacuum, to aid in the removal of the ether from the reaction product, for instance, after dilution with benzene as described above, but temperatures appreciably above 50 degrees C., should not be used since product decomposition tends to occur. Removal of the ether can, of course, also be effected by vacuum or by purging with an inert gas. Where alkyllithiums are produced, the reaction mixture, upon the incorporation of the alkyl chloride, is cooled to generally in the range of 30 to 40 degrees C.

The concentration of lithium metal in the reaction mixture will generally fall within the range of 0.5 to 6 gram atoms of lithium per liter of organic solvent or solvents, a particularly preferred range being from 1.5 to 4 gram atoms of lithium per liter.

Yields of the lithium-hydrocarbon compounds obtained, pursuant to the present invention, generally range from in excess of 70% to well over 90%, depending upon a variety of factors.

In order that the full details of the present invention will be even more fully appreciated, the following examples are provided. These examples are illustrative of the practice of the method of the invention and it will be understood that variations and modifications may be made therein, in a number of particulars, as hereafter pointed out, without in any way departing from the fundamental principles and teachings provided herein. The examples, therefore, are not to be construed in any way as limitative of the scope of the invention. In said examples, the lithium metal dispersion utilized was one containing about 0.75% sodum and in which the majority of said particles were in the 10 to 20 micron size range.

Example 1

28.5 g. of lithium metal, as a 30 wt. percent dispersion in mineral oil, were charged to an argon-swept reaction flask fitted with a mechanical stirrer, thermometer, addition funnel and reflux condenser. The flask was cooled to −25 degrees C. Then, 304 g. of benzene were added to the dispersion and 755 g. of dimethyl ether were condensed into the foregoing mixture. The addition funnel was filled with 255 g. of isoprene. The temperature was maintained at −25 degrees C. and stirring was begun. Then, 51 g. of a benzene solution (0.8 N concentration) of a preformed dilithium-polyisoprene adduct [1] was added. Then, 5 g. of isoprene were rapidly added to the reaction mixture in the flask. The reaction initiated immediately as indicated by a temperature rise and the formation of a green color. The isoprene was slowly added during a 1 hour period. When the reaction was complete, the excess dimethyl ether was removed and additional benzene was added to obtain a product solution that was 0.9 molar in dilithium-polyisoprene adduct. The product solution was filtered. The yield was 94%.

Example 2

Into an argon-swept 22 liter round bottom flask mounted in an outer cooling container and equipped with stirrer, thermometer, reflux condenser, gas inlet tube and filter tube, there were accurately metered 490.2 g. of a 28.5 wt. percent dispersion of lithium metal in mineral oil, the particle size of the lithium metal being essentially in the range of 0.01 to 0.1 mm. in diameter. A volume of 2.4 liters of benzene was added, stirring ---
[1] In contrast, where the same procedure as described in Example 1 was carried out except that no preformed dilithium-polyisoprene adduct was employed as an initiator, no reaction occurred within 20 minutes after the rapid addition of the 5 g. of isoprene, as evidenced by the lack of color formation in the flask, and the attempted reaction was then discontinued.

was begun and the flask and contents were cooled to −40 degrees C. Then 4.8 liters of dimethyl ether were condensed as a liquid into said mixture and 300 ml. of a 0.93 molar solution in benzene of an adduct of lithium and isoprene were added and the contents of the flask were stirred for 15 minutes. Then 40 ml. of isoprene were added. An instantaneous temperature rise occurred following by a vivid green coloration, and some refluxing of benzene occurred. The remainder of a weight of 1290.5 g. (18 mols.) in which is included the above 40 ml. of isoprene was added gradually over a period of 2 to 2½ hours while maintaining the temperature of −20 to −30 degrees C. Then, promptly, 6.3 liters of benzene wre added and argon gas was passed over the reaction mixture for 16 to 24 hours to purge the solution of dimethyl ether. Thereupon, 6 liters of benzene were added and the reaction mixture was warmed in a water bath to 30–35 degrees C. and kept at such temperature for 1 hour. The solution was filtered, to remove unreacted lithium metal, into an argon-flushed 5 gallon bottle. The resulting final solution was a clear red to reddish brown liquid having a lithium-isoprene adduct concentration of 0.88 equivalent per liter (80.5% conversion of lithium metal to soluble form).

Example 3

79.4 g. of lithium metal as 30 wt. percent dispersion in mineral oil were charged to an argon-swept flask fitted with a mechanical stirrer, thermometer, addition funnel, and reflux condenser. Then 476 g. of heptane were added to the dispersion. The addition funnel was filled with a solution containing 460 g. of n-butyl chloride and 300 g. of heptane, stirring was begun, and 15 g. of said solution were added rapidly. After 30 minutes, no visible reaction had taken place. Then, 25 g. of a previously formed solution of n-butyllithium in heptane (3.0 molar concentration) were added to the reaction mixture. A vigorous reaction set in immediately. The solution in the addition funnel was added slowly over a 2½ hour period. Cooling was provided to maintain a reaction temperature between 30 and 40 degrees C. When the reaction was complete, the product solution was filtered and was found to be 2.05 molar in n-butyllithium. The yield was 74%.

Example 4

8.2 g. of finely dispersed lithium metal in 340 g. of THF were charged to the reaction flask described in Example 1. The mixture was cooled to −25 degrees C. Then, 15 g. of preformed vinyl-lithium [2] (0.97 molar concentration) were added to the stirred dispersion. A 10 minute reaction period was allowed. Then 31 g. of vinyl chloride were slowly added as a gas. Cooling was provided to maintain the reaction temperature at −25 degrees C. When the addition of the halide was complete, the product solution was filtered and was found to be 1.1 molar in vinyllithium. The yield was 91.5%.

Example 5

152 g. of finely dispersed lithium metal in 2720 g. of heptane were charged to a reaction flask. The flask was fitted with a mechanical stirrer, thermometer, addition funnel, and reflux condenser. The addition funnel was filled with 920 g. of isobutyl chloride. Stirring was begun and 40 parts of the isobutyl chloride were added rapidly. After 30 minutes no visible reaction had taken place. Then, 100 g. of a preformed solution of isobutyllithium in heptane (2.0 molar concentration) were added. The reaction was initiated immediately as shown by a rise in the temperature. The isobutyl chloride was slowly added during a 2 hour period. Cooling was provided to maintain a reaction temperature of 35 degrees C. When the reaction was completed, the product solution was filtered and was found to be 2.6 molar in isobutyllithium. The yield was 81%.

Example 6

165 g. of finely dispersed lithium metal in 496 g. of pentane were charged to the reaction flask. The flask was fitted with mechanical stirrer, thermometer, addition funnel, and reflux condenser. The addition funnel was filled with a solution containing 263 g. of tert-butyl chloride and 124 g. of pentane. Then, 25 g. of a preformed solution of tert-butyllithium in pentane (2.06 molar concentration) were added. The dispersion mixture was then heated to 30 degrees C. Then, 5 g. of the tert-butyl chloride solution were added rapidly. A smooth initiation resulted which was readily controlled. The tert-butyl chloride solution was added slowly during a 1 hour period. Cooling was provided to maintain a reaction temperature of 35 degrees C. When the reaction was complete, the product solution was filtered and was found to be 2.35 molar in tert-butyllithium. The yield was 84%.

Example 7

39.8 g. of finely dispersed lithium metal in 225 g. of pentane were charged to a reaction flask. The flask was fitted with a thermometer, mechanical stirrer, addition funnel, and reflux condenser. Then, 30 parts of a preformed solution of isopropyllithium in pentane (1.1 molar concentration) were added to the stirred dispersion. The mixture was heated to 35 degrees C. Then, 180 g. of isopropyl chloride in 110 g. of pentane were placed in the addition funnel. Ten minutes after the preformed isopropyllithium [3] solution was added, 5 g. of the isopropyl chloride solution were added rapidly. An instant initiation of the reaction set in as shown by a temperature rise. Cooling was provided to maintain the reaction temperature at 35 degrees C. The remainder of the isopropyl chloride solution was added slowly during a 1 hour period. When the reaction was completed, the product solution was filtered and was found to be 1.4 molar in isopropyllithium. The yield was 84%.

Example 8

Into a 5 liter, 3-necked, round bottom flask equipped with Dry Ice condenser (inert gas inlet at the top), thermometer, mechanical stirrer and 500 ml. graduated dropping funnel, there was placed 280 g. of a 30 weight percent lithium dispersion in mineral oil. Dry "unsaturate free" n-pentane (ca. 1 liter) was added, the mixture stirred, and the lithium metal allowed to settle. The n-pentane solution was decanted off and 500 ml. of fresh n-pentane added. Three ml. of 90 weight percent n-butyllithium was added and the mixture was allowed to stir for 1 hour. Ten ml. of an isobutyl chloride solution made up of 555 g. (6 moles) of isobutyl chloride in 2 liters of n-pentane was added to the stirred mixture at once. Within 10 minutes the temperature of the mixture rose from 11° C. to 27° C., indicating initiation of reaction. The remainder of the isobutyl chloride solution was then added

---

[2] This may be contrasted with the following example where no preformed vinyllithium was utilized as an activator. 8.2 g. of finely dispersed lithium metal in 250 g. of tetrahydrofuran (THF) were charged to an argon-swept reaction flask. The flask was fitted with a mechanical stirrer, reflux condenser, gas inlet tube, and thermometer. The mixture was cooled to −25 degrees C. and 31 g. of vinyl chloride were slowly added as a gas to the stirred dispersion. Cooling was provided to maintain the reaction temperature at −25 degrees C. When the addition of the vinyl chloride was complete, the product solution was filtered and was found to be 0.67 molar in vinyllithium. The yield was approximately 30%.

[3] This may be contrasted with the following example where no preformed isopropyllithium was utilized as an activator. 39.8 g. of finely dispersed lithium metal in 225 g. of pentane were charged to the reaction flask described in Example 3. The addition funnel was filled with 180 g. of isopropyl chloride and 110 g. of pentane. The dispersion mixture was heated to 35 degrees C. Stirring was begun and 5 g. of the isopropyl chloride solution were added rapidly. A very slow reaction set in after 10 minutes. The addition of the isopropyl chloride solution was begun. After 40 g. of the isopropyl chloride solution had been added, the reaction temperature dropped indicating a decrease in reaction rate due to improper initiation. The run was discontinued.

over a 19 hour period. The mixture was stirred for 1 hour longer and then pumped into a filter funnel under dry nitrogen. The clear product solution (1.88 liters) was filtered off. It was found on analysis to contain 2.12 moles of isobutyllithium per liter—yield: 67% based on isobutyl chloride.

Example 9

Into a 12 liter round-bottom stainless steel resin flask fitted with a 4-necked glass head equipped with a Dry Ice condenser, mechanical stirrer, gas inlet tube and thermometer, was placed 550 g. of a 30 weight percent lithium dispersion in mineral oil and 2 liters of dry n-hexane. The mixture was stirred thoroughly, allowed to settle, and the mineral oil-hexane wash decanted through a dip-tube under a slight pressure of nitrogen. Enough dimethyl ether was then condensed into the flask to bring the total volume to 6 liters using an external cooling bath of Dry Ice and n-hexane (−50° C.). Two hundred ml. of a 1.0 N solution of the dilithio adduct of isoprene in benzene-dimethyl ether solution was added and the mixture stirred for about 15 minutes. Vinyl chloride gas (40 g.) was passed into the flask through the gas inlet tube. Within 15 minutes a green color appeared and the temperature rose several degrees indicating initiation of reaction. The remainder of the vinyl chloride (710 g.) was added over a period of 1 hour and 40 minutes to the rapidly stirred mixture keeping the temperature between −40° and −50° C. After completion of the halide feed, 3 liters of dry tetrahydrofuran was added slowly to the mixture. The reaction mixture was then allowed to warm to room temperature overnight to drive off most of the dimethyl ether. The dark orange residual product solution (4.12 liters) was filtered away from the lithium chloride residue. On analysis, the solution was found to contain 2.15 moles of vinyllithium per liter representing a yield of 73.5%.

We claim:

1. A method of preparing organic solvent solution of lithium-hydrocarbon compounds corresponding to the formula R—Li$_x$, where R is a hydrocarbon radical selected from the group consisting of alkyl, aryl, alkylene, arylene and alkenylene, and $x$ is an integer from 1 to 4, which comprises providing a dispersion of finely divided lithium in a liquid with which the lithium is essentially unreactive, adding thereto, as a catalyst, a preformed lithium-hydrocarbon compound corresponding to the formula D—Li$_x$, where R is a hydrocarbon radical as aforesaid and $x$ is an integer as aforesaid, and gradually adding to the reaction mixture a member selected from the group consisting of unsaturated hydrocarbons and hydrocarbon halides which is reactive with lithium to produce a R—Li$_x$ compound.

2. A method according to claim 1, where the R—Li$_x$ compound which is used as a catalyst is the same R—Li$_x$ compound which is produced by said method.

3. A method according to claim 1, wherein R is C$_2$ to C$_{20}$.

4. A method according to claim 3, wherein the hydrocarbon halide which is added to the reaction mixture is a C$_2$ to C$_8$ alkyl halide.

5. A method according to claim 2, wherein R is a C$_3$ to C$_4$ alkyl, the alkyl halide which is added to the reaction mixture is a C$_3$ to C$_4$ alkyl chloride or bromide which is added gradually and while cooling, and wherein, after the reaction, the reaction mixture is filtered to recover a solution of the C$_3$ to C$_4$ alkyllithium.

6. A method according to claim 5, wherein the liquid with which the lithium is essentially unreactive is a saturated liquid hydrocarbon.

7. A method according to claim 6, wherein R—Li is n-butyllithium, the catalyst is preformed n-butyllithium dissolved in heptane, and the C$_3$ to C$_4$ alkyl chloride or bromide which is added is n-butyl chloride, and the reaction mixture is maintained by said cooling at a temperature in the range of about 30 to 40 degrees C.

8. A method according to claim 6, wherein R—Li$_x$ is isobutyllithium, the catalyst is preformed isobutyllithium dissolved in heptane, and the C$_3$ to C$_4$ alkyl chloride or bromide which is added is isobutyl chloride, and the reaction mixture is maintained by said cooling at a temperature in the range of about 30 to 40 degrees C.

9. A method according to claim 6, wherein R—Li$_x$ is tert-butyllithium, the catalyst is preformed tert-butyllithium dissolved in heptane, and the C$_3$ to C$_4$ alkyl chloride or bromide is tert-butyl chloride.

10. A method according to claim 1, wherein R—Li$_x$ is vinyllithium dissolved in a saturated liquid ether, the hydrocarbon halide which is added to he reaction mixture is gaseous vinyl chloride, and cooling is effected during the addition of said vinyl chloride to maintain the reaction mixture below 0 degrees C.

11. A method according to claim 1, wherein the major amount of the unsaturated hydrocarbons or hydrocarbon halides are gradually added to the reaction mixture containing the dispersion of finely divided lithium and the added preformed lithium-hydrocarbon compound.

12. A method according to claim 4, wherein, after the admixture of the dispersion of finely divided lithium with the preformed lithium-hydrocarbon compound, a small proportion of the total amount of the hydrocarbon halide is rapidly added followed by the gradual addition of the remaining major proportion of said hydrocarbon halide to the reaction mixture.

References Cited

UNITED STATES PATENTS 2,948,762  8/1960  Muench et al. _____ 260—665

OTHER REFERENCES

Gilman et al.: J. Am. Chem. Soc., 55 (1933), pp. 1252–7.

Tyler et al.: J. Am. Chem. Soc., 70 (1948), p. 2877.

TOBIAS E. LEVOW, Primary Examiner.

A. P. DEMERS, Assistant Examiner.

U.S. Cl. X.R.

252—431; 260—94.2